United States Patent [19]

Foladare et al.

[11] Patent Number: 6,073,235
[45] Date of Patent: Jun. 6, 2000

[54] PRIVATE BROADCAST COMMUNICATION SYSTEM AND METHOD FOR PRIVATE BROADCAST COMMUNICATION OVER A WIRED OR WIRELESS NETWORK

[75] Inventors: Mark Jeffrey Foladare, Kendall Park; Shelley B. Goldman, East Brunswick, both of N.J.

[73] Assignee: AT&T Corp., New York, N.Y.

[21] Appl. No.: 08/881,298

[22] Filed: Jun. 24, 1997

[51] Int. Cl.[7] .................................. H04L 9/08; H04N 7/16
[52] U.S. Cl. .......................... 713/163; 713/155; 713/172; 380/279; 345/327; 370/320
[58] Field of Search .................................. 380/1–59, 240, 380/241, 242; 370/320; 345/327

[56] References Cited

U.S. PATENT DOCUMENTS

| | | | |
|---|---|---|---|
| 5,369,705 | 11/1994 | Bird et al. ................................... | 380/21 |
| 5,592,470 | 1/1997 | Rudrapatna et al. .................... | 370/320 |
| 5,592,552 | 1/1997 | Fiat ........................................... | 380/21 |
| 5,696,823 | 12/1997 | Blaze ........................................ | 380/21 |
| 5,809,140 | 9/1998 | Rubin et al. ............................. | 380/21 |
| 5,832,092 | 11/1998 | Okuda et al. ............................ | 380/49 |
| 5,877,755 | 3/1999 | Hellhake .................................. | 345/327 |

FOREIGN PATENT DOCUMENTS

WO 85/03830  8/1985  WIPO ..................................... 380/20

*Primary Examiner*—Tod R. Swann
*Assistant Examiner*—Jennifer Coombs
*Attorney, Agent, or Firm*—Oliff & Berridge, PLC

[57] ABSTRACT

A private broadcasting system includes communication terminals which are coupled to both a broadcasting network and point-to-point network. A private broadcasting device included in the broadcasting system is coupled to a database that contains a pool of encryption keys and a pool of channel numbers. The encryption keys and channel numbers are assigned to a private broadcast request when the communicating partners of the private broadcast request are available for communication. The encryption key and channel number is issued to each of the participating terminals. Each of the participating terminals encrypts and de-encrypts the information transmitted on and received from the broadcasting channel at the assigned channel number. In this way, the terminals communicate with each other privately excluding all other terminals that are not part of the private broadcast communication.

45 Claims, 6 Drawing Sheets

PRIVATE BROADCAST COMMUNICATION SYSTEM AND METHOD FOR PRIVATE BROADCAST COMMUNICATION OVER A WIRED OR WIRELESS NETWORK

BACKGROUND OF THE INVENTION

1. Field of Invention

The present invention relates to private communications using a broadcast communication system.

2. Description of Related Art

Broadcast communication systems provide the technology for transmitting large amounts of data such as analog voice and video as well as digital data. However, such data is directed to a geographical area either wirelessly or through cable connections. The data transmitted by the broadcasting system may be received by any receiver in the geographical area. Thus, private two-way communications over a broadcast communication system is not available.

In view of the above, benefits of broadcasting technologies are not exploited for private communications. Thus, new technology is needed to take advantage of broadcasting technology for private communications.

SUMMARY OF THE INVENTION

This invention provides a private broadcasting system that includes communication terminals which are coupled to both a broadcasting network and a point-to-point network. A private broadcasting device included in the broadcasting system is coupled to a database that contains a pool of encryption keys and channel numbers. When a subscriber decides to engage in private broadcast communication with other communicating partners, the subscriber sends a private broadcast request to the private broadcasting device. If the communicating partners are available, the private broadcasting device assigns an encryption key and a channel number to the subscriber's terminal and to each of the participating terminals.

The participating terminals broadcast information on the channel corresponding to the channel number. Each of the participating terminals encrypts and de-encrypts the information transmitted on and received from the broadcasting channel. In this way, the terminals communicate with each other privately excluding all other terminals that are not part of the private broadcast communication.

BRIEF DESCRIPTION OF THE DRAWINGS

The invention is described with reference to the following drawings wherein like numerals represent like elements, and wherein.

DETAILED DESCRIPTION OF PREFERRED EMBODIMENTS

Figure 1:
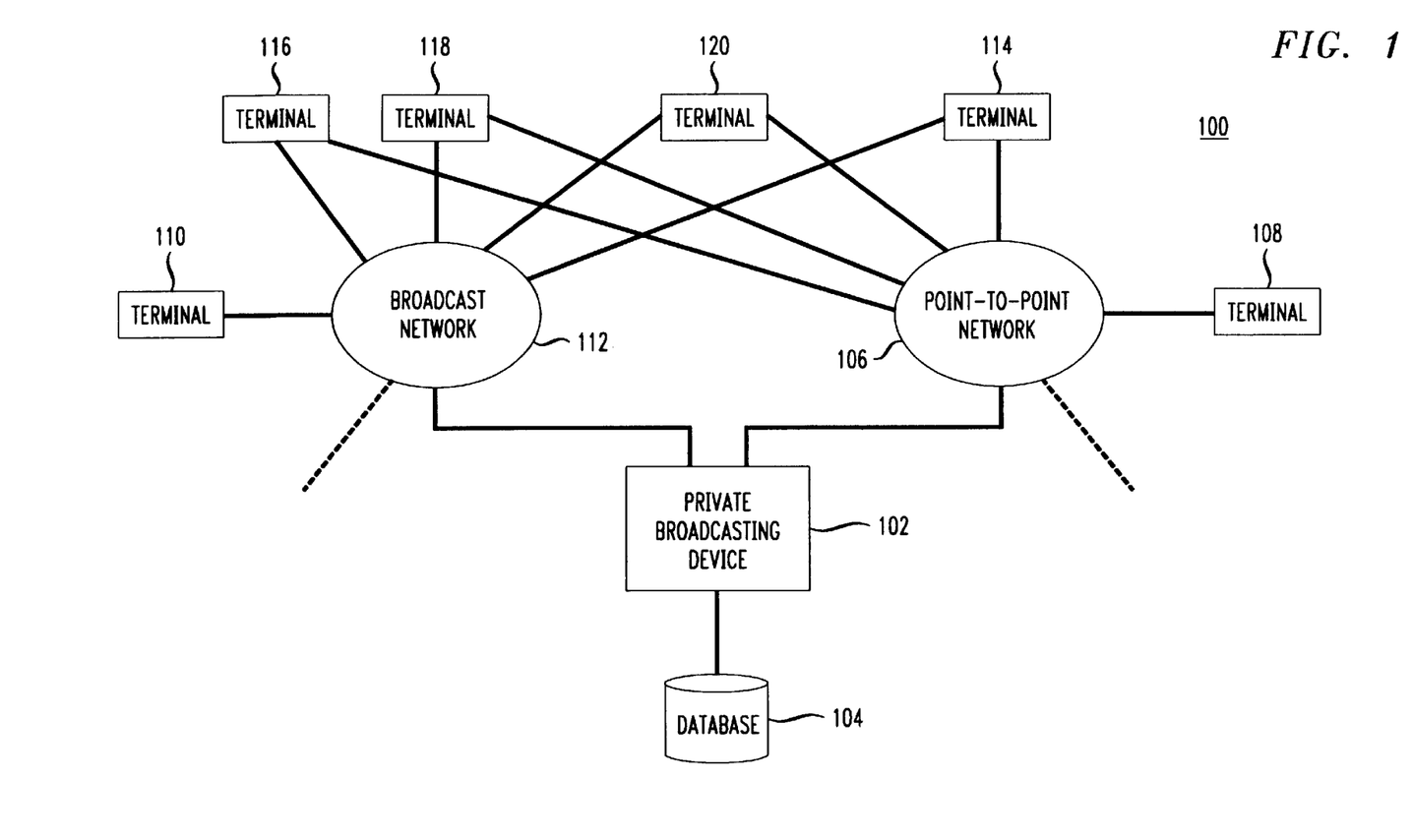
FIG. 1 is a diagram of a private broadcasting system.

FIG. 1 shows a private broadcasting system 100 that includes a private broadcasting device 102 coupled to a broadcasting network 112 and a point-to-point network 106. The broadcast network 112 may include networks such as wireless T.V. broadcasting networks or cable networks and the point-to-point network 106 may include systems such as a telephone communication network or a paging communication network. Thus, both the broadcast network and the point-to-point network may be either wired or wireless networks.

The private broadcasting system 100 includes terminals 114–120 which are coupled to both the broadcasting network 112 and the point-to-point network 106. The broadcasting network 112 and the point-to-point network 106 may also be connected to other terminals 110 and 108, respectively, that do not participate in the private broadcast communication.

The private broadcasting device 102 is coupled to a database 104 that contains a pool of encryption keys and a pool of channel numbers. The encryption keys and channel numbers are assigned by the private broadcasting device 102 based on private broadcast requests sent by any one of the terminals 114–120. When one of the terminals, such as terminal 114, sends a private broadcast request, the private broadcasting device 102 processes the private broadcast request to establish the private broadcast communication.

The private broadcast request may be sent either through the broadcasting network 112, via a specified channel of a cable network for example, or through the point-to-point network 106 by calling the private broadcasting device 102, via a telephone number such as an 800 number for example. After receiving the private broadcast request, the private broadcasting device 102 assigns to the private broadcast request an encryption key from the encryption key pool and a channel number from the channel number pool and distributes the encryption key and channel number to all the terminals that will participate in the private broadcast communication.

Each of the terminals 114–120 that receives the assigned encryption key and channel number begins to transmit and receive information on the assigned channel by encrypting information to be transmitted using the encryption key and de-encrypting the received information using the encryption key. Thus, terminals 114–120 that participate in the private communication may communicate with each other and exclude all other terminals 114–120 not part of the private broadcast communication because only those terminals 114–120 that are participating in the private broadcast communication have the assigned encryption key to de-encrypt the broadcasted information.

Any method of bandwidth allocation may be used and the channel number merely identifies a specific resource allocated to a private broadcast communication. For example, if Frequency Domain Multiplexing (FDM) is used, then one channel number indicates one of the frequency channels. If a frequency band is used to transmit information using a frame type protocol, then each frame corresponds to a specific private broadcast communication. The information in each frame is encrypted by a single encryption key. This second method permits many private broadcast communications to be supported by a single frequency band.

The private broadcasting device 102 monitors the progress of each private broadcasting communication. When the private broadcast communication is completed, a release message is transmitted by one of the terminals participating in the private broadcast communications. The assigned encryption key and channel number is returned to the private broadcasting device 102. When no activity is detected on the assigned channel for a predetermined amount of time, the private broadcasting device 102 invalidates the encryption key by sending a invalidation command to all the terminals 114–120 that participated in the private broadcast communication. The encryption key and the assigned channel to an encryption key pool and a channel is returned number pool, respectively, in the database 104.

After receiving the invalidate command, each of the participating terminals 114–120 destroys the encryption key. This prevents inadvertent or unintentional use of an invalidated encryption key and allows the encryption key to be issued to another private broadcast communication. The private broadcasting device 102 may send the invalidate command even if a release message is received.

Figure 2:
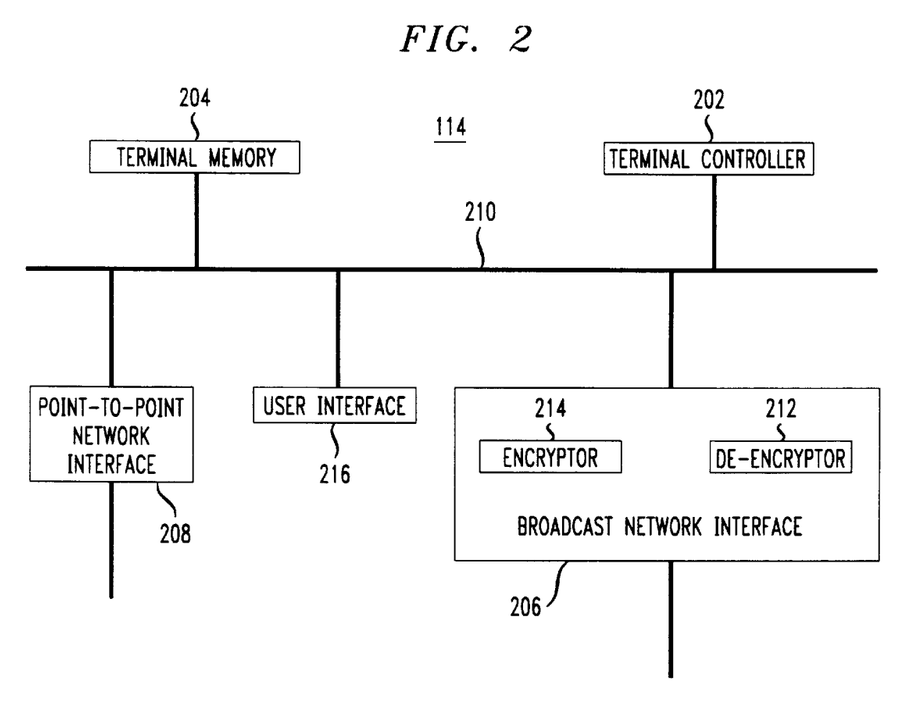
FIG. 2 is a block diagram of a terminal shown in FIG. 1.

FIG. 2 shows a block diagram of an exemplary embodiment of a terminal such as the terminal 114. The terminal 114 includes a terminal controller 202, a terminal memory 204, a broadcast network interface 206, a point-to-point network interface 208 and an user interface 216. All of the above components are coupled together via bus 210.

A user enters a request for private broadcast communication through the user interface 216. The user interface 216 may be a keyboard of a personal computer for example. When the user interface 216 receives the request, a signal is sent to the terminal controller 202 which in turn generates a private broadcast request.

Figure 3:
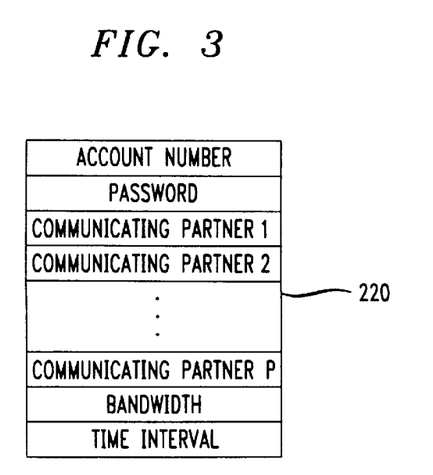
FIG. 3 is a diagram of a private broadcast request.

FIG. 3 shows an example of a private broadcast request 220. The private broadcast request 220 may include information such as an account number, a password, and a list of communicating partners 1, 2 . . . p, a requested bandwidth and an estimated time interval for the private broadcast communication. The account number identifies a subscriber to the private broadcast communication system 100. The account number may be used for billing as well as any personalized tailoring of the private broadcast communication that may be stored in the private broadcast communication device 102 as a profile for the subscriber.

While the private broadcast communication may be used between only two parties, the subscriber may have established groups with whom to communicate using the private broadcasting communication system 100. Groups such as sports clubs, family and friends, or business partners may be assigned a special name. The inclusion of such a name as a communicating partner in the private broadcast request 220 indicates to the private broadcast communication device 102 to contact each of the members of the group identified by the group name to establish the private broadcast communication.

The requested bandwidth may be used to indicate an anticipated data rate requirement. For example, if the private broadcast system 100 will be used to conduct a text only communication, a very small amount of bandwidth would be required. However, if the private broadcast system will be used for a multimedia communication, then a large amount of bandwidth will be required. The private broadcasting device 102 may use the requested bandwidth in the private broadcast request 220 to select appropriate channels that matches the required bandwidth.

For example, the total bandwidth allocated for private broadcast communication may be divided into groups of channels. One group of channels may be assigned to text only communication while another group of channels may be assigned to multimedia communication.

The estimated time interval in the private broadcast request 220 provides the private broadcasting device 102 an indication of how long the private broadcast communication may extend. If an extremely long interval is requested, the private broadcasting device 102 may assign a channel that is allocated for long-term uses. In contrast, if the time interval is very short such as half an hour, then other channel assignments may be made.

After generating the private broadcast request 220, the terminal controller 202 transmits the private broadcast request 220 to the private broadcasting device 102. The terminal controller 202 may transmit the private broadcast request 202 to the private broadcasting device 102 by transmitting through 1) the point-to-point network interface 208 via the point-to-point network 106 or 2) the broadcast network interface 206 via the broadcast network 112.

If the broadcast network interface 206 is used, the terminal controller 202 may use a preallocated request channel and a request protocol for example so that requests from multiple subscribers may be accommodated. In this regard, a plurality of channels may be assigned for this purpose so that ready access to the private broadcasting device 102 may be obtained.

After the private broadcast request 220 is transmitted, the terminal controller 202 monitors the point-to-point network interface 208 for a return message from the private broadcasting device 102. The return message may indicate that none of the communicating partners are available for the private broadcast communication. If at least one of the communicating partners is available, the private broadcasting device 102 issues the assigned encryption key and channel number in a return message to all the communicating partners for the requested private broadcast communication.

When the return message is received from the private broadcasting device 102, the terminal controller 202 loads the encryption key and the channel number in the broadcast network interface 206 to prepare for the private broadcast communication. After the broadcast network interface 206 is initialized, the controller 202 sends a message to the user through the user interface 216 such as "Ready For Communication," for example. As directed by the user through the user interface 216, the terminal controller 202 sends information to be broadcasted to the broadcast network 112 through the broadcast network interface 206. The broadcast network interface 206 first encrypts the information through encrypter 214 before broadcasting through the broadcast network 112.

The broadcast network interface 206 receives information being broadcasted by other communicating partners through the broadcast network 112 and de-encrypts the received information through the de-encrypter 212. The de-encrypted information is returned to the controller 202 or to a location in the terminal memory 204 as directed by the terminal controller 202. The terminal controller 202 then outputs the information to the user through the user interface 216. The user interface 216 may be a display monitor of a personal computer or a sound card that reproduces audio information or both, for example.

When the private broadcast communication is completed, the user may explicitly terminate the private broadcast communication through the user interface 216. When the explicit command to terminate the private broadcast communication is received, the terminal controller 202 sends the release message to the private broadcasting device 102 explicitly releasing the encrypter key and channel number assigned to the private broadcast communication.

Figure 4:
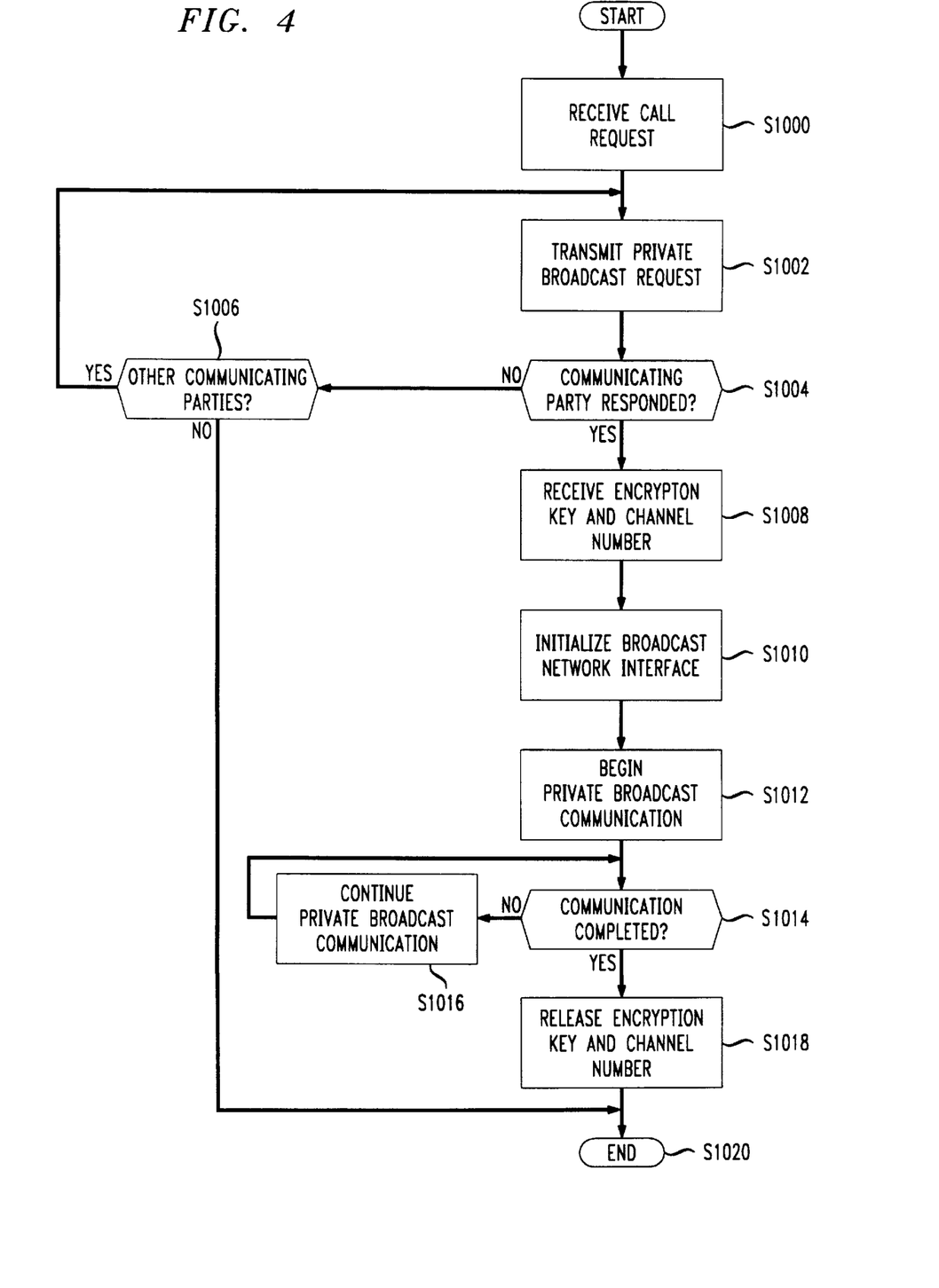
FIG. 4 is a flowchart of a terminal process for requesting a private broadcast communication.

FIG. 4 shows a process for the terminal 114 to request a private broadcast. In step S1000, the terminal controller 202 receives a request from the subscriber for private broadcast communication and goes to step S1002. In step S1002, the terminal controller 202 formats and transmits a private broadcast request 220 based on the inputs received from the subscriber and then goes to step S1004.

In step S1004, the terminal controller 202 determines whether the private broadcasting device 102 has sent the message indicating that at least one of the communicating parties indicated in the private broadcast request has responded. If at least one communicating party has responded, the terminal controller 202 goes to step S1008; otherwise, the terminal controller 202 goes to step S1006. In step S1006, the terminal controller queries the subscriber whether other communicating parties are desired. If other communicating parties are desired, the terminal controller 202 returns to step S1002; otherwise, the terminal controller 202 goes to step S1020 and ends the process.

In step S1008, the terminal controller 202 receives the return message containing the encryption key and the channel number assigned by the private broadcasting device 102 and goes to step S1010. In step S1010, the device controller 202 initializes the broadcast network interface 206 with the assigned encryption key and channel number and goes to step S1012. In step S1012, the terminal controller 202 begins the private broadcast communication and goes to step S1014.

In step S1014, the terminal controller 202 determines whether the private broadcast communication has completed. For example, the subscriber (or other communicating partners) may have issued an explicit command to terminate the private broadcast communication through the user interface 216, or, alternatively, a preset amount of time has expired without any information being transmitted or received. If the private broadcast communication has completed, the terminal controller 202 goes to step S1018; otherwise, the terminal controller 202 goes to step S1016. In step S1016, the terminal controller 202 continues private broadcast communication and returns to step S1014. In step S1018, the terminal controller 202 releases the encryption key and channel number to the private broadcasting device 102 by sending a release message and goes to step S1020 and ends the process. If an invalidate message is received from the private broadcasting device during any of the above steps, the terminal controller 202 destroys the encryption key (if any) and ends the process.

If the terminal 114 is being contacted by the private broadcasting device 102, the point-to-point network interface 208 receives the contact from the private broadcasting device 102 and sends a signal to the terminal controller 202 that the terminal 114 is requested to participate in a private broadcast communication. The terminal controller 202 alerts the user through the user interface 216 that the user is requested to participate in a private broadcast communication. If the user chooses not to participate or no response is received from the user, the terminal controller 202 either sends a message to the private broadcasting device 102 that the user is not available or simply disconnects from the point-to-point network 106. However, if the user desires to participate in the private broadcast communication, the terminal controller 202 sends a accept message to the private broadcasting device 102 that the terminal 114 is available for the private broadcast communication.

The contact may also be made through a broadcast channel by a predetermined protocol. For example, if the terminal detects that its address is broadcasting on a special channel, then, the terminal 114 is being contacted for a personal broadcast communication.

After sending the accept message, the terminal controller 202 receives a return message containing the encryption key and the channel number from the private broadcasting device 102 and initializes the broadcast network interface with the encryption key and the channel number. After initialization, the broadcast network interface 206 begins to receive information from the assigned channel number and de-encrypts the received information through the de-encrypter 212 before transferring the information to either the terminal controller 202 or the terminal memory 204. If the user of the terminal 114 desires to broadcast information, the terminal controller 202 sends the information to the broadcast network interface 206 for the information to be encrypted by the encrypter 214 before broadcasting through the broadcast network 112.

Figure 5:
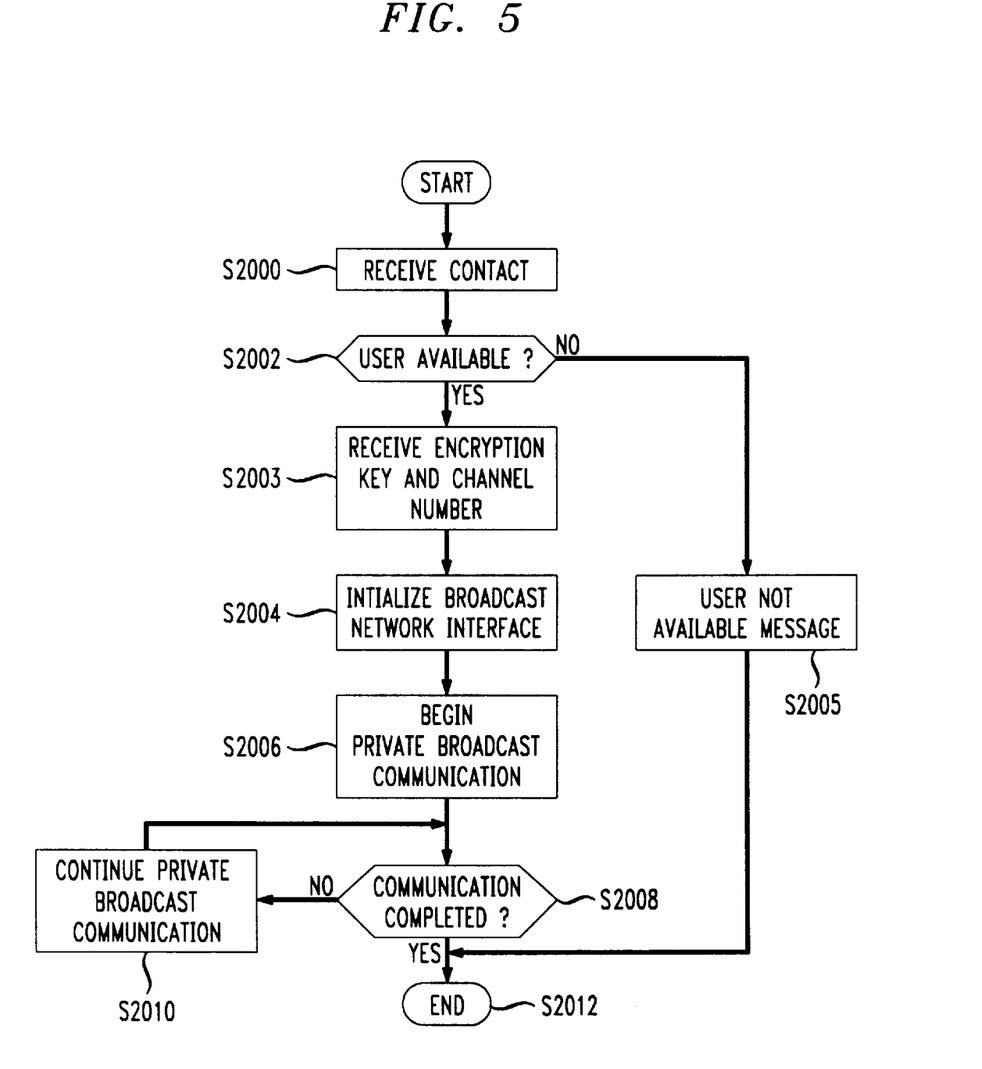
FIG. 5 is a block diagram of a private broadcasting device shown in FIG. 1.

FIG. 5 shows a terminal process for receiving a contact from the private broadcasting device 102. In step S2000, the terminal controller 202 receives the contact from the private broadcasting device 102 and goes to step S2002. In step S2002, the terminal controller 202 determines whether the user is available to communicate in the private broadcast communication. If the user is available, the terminal controller 202 sends an accept message and goes to step S2003; otherwise, the terminal controller goes to step S2005 and sends a "user not available" message to the private broadcasting device 102 and then goes to step S2012 and ends the process.

In step S2003, the terminal controller 202 receives the return message containing the encryption key and the channel number and goes to step S2004. In step S2004, the terminal controller 202 initializes the broadcast network interface 206 and goes to step S2006. In step S2006, the terminal controller 202 beings the private broadcast communication and then goes to step S2008.

In step S2008, the terminal controller 202 determines whether the private broadcast communication has completed. If the private broadcast communication has not completed, the terminal controller 202 goes to step S2010; otherwise the terminal controller 202 goes to step S2012 and ends the process. In step S2010, the terminal controller 202 continues the private broadcast communication and returns to step S2008.

Figure 6:
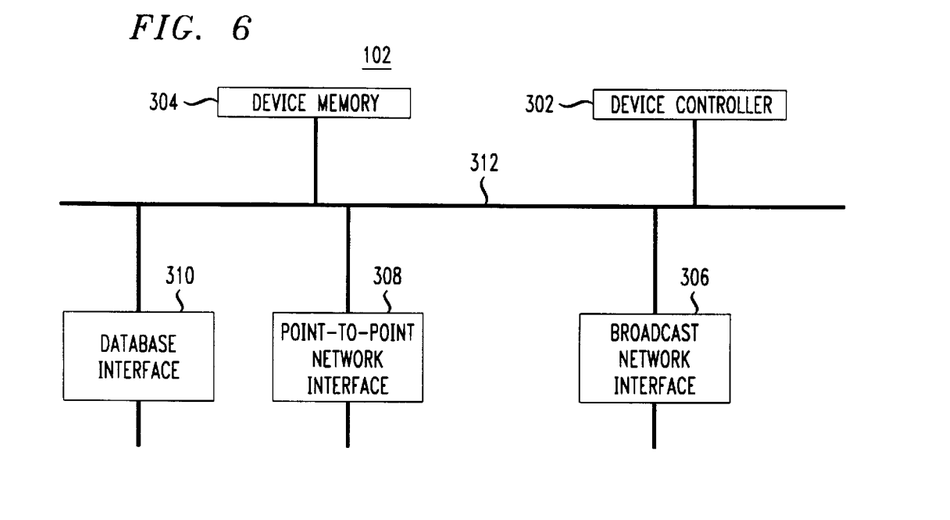
FIG. 6 is a flowchart of a terminal process for receiving the private broadcast communication.

FIG. 6 shows a block diagram of the private broadcasting device 102. The private broadcasting device 102 includes a device controller 302, a device memory 304, a broadcast network interface 306, a point-to-point network interface 308, and a database interface 310. All of the above components are coupled together via bus 312.

When a private broadcast request is received through the either the point-to-point network interface 308 or the specified channel through the broadcast network interface 306, the device controller 302 retrieves subscriber data responding to the account number in the private broadcast request from either the device memory 304 or from a database 1014 coupled to the database interface 310. While the database 104 is shown to be coupled to the private broadcast device 102 through the database interface 210, the database 104 may be contained in the device memory 304 or coupled to the point-to-point network 106 and accessed through the point-to-point network interface.

The subscriber data contains information such as a password, billing information, and subscriber profiles as discussed earlier, for example. After verifying that the password contained in the private broadcasting request is valid and that the account is valid (i.e., payments have been made), the device controller 302 selects an encryption key and a channel number based on the requested bandwidth and the estimated time interval.

Figure 7:
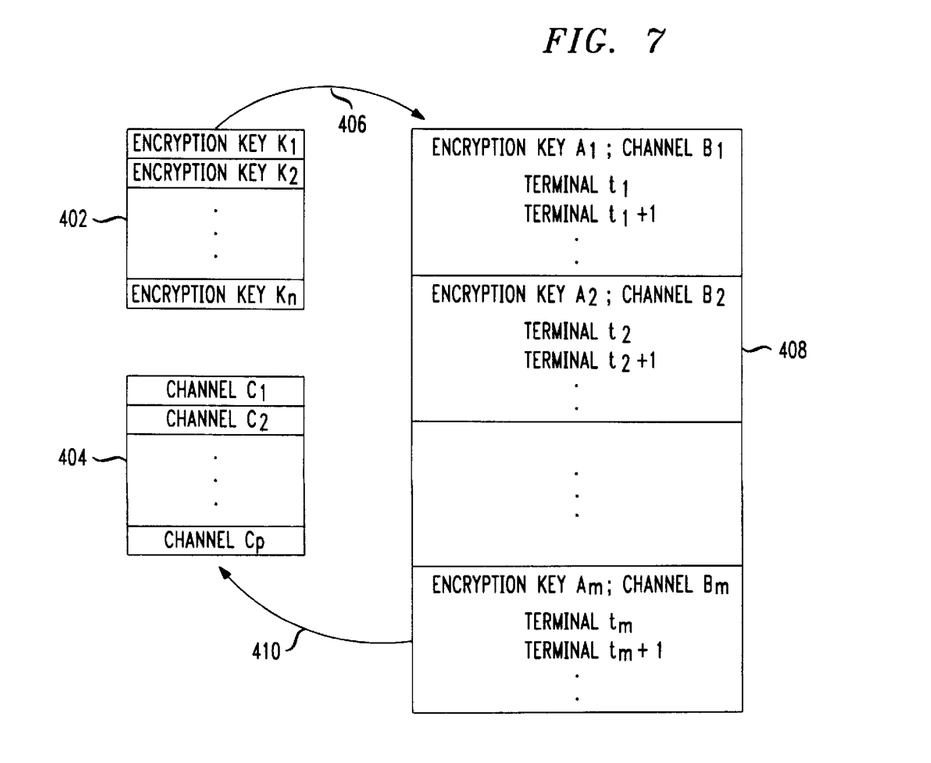
FIG. 7 is a diagram of an encryption key and channel assignment processes.

FIG. 7 shows a diagram of the process for managing the encryption keys and the channel numbers. The device controller 302 maintains an encryption key pool 402 containing encryption keys $K_1, K_2, \ldots K_n$ and channel number pool 404 containing channel numbers $C_1, C_2, \ldots C_p$ in the database 104 or memory 304. The pool of encryption keys and assigned numbers may be generated "on-the-fly." When a private broadcast request 220 is received, the device controller 302 selects an encryption key from the encryption key pool 402 and assigns the encryption key to the private broadcast request. Then, based on the requested bandwidth and the estimated time interval, a channel number from the channel number pool 404 is selected and assigned to the private broadcast request 220.

After the encryption key and the channel number are assigned, the device controller 302 attempts to contact the communicating partners indicated in the private broadcast request 220. If none of the communicating partners are available, the device controller 302 returns a signal to the requesting terminal 114–120 to indicate that the private broadcast request cannot be completed.

If at least one of the communicating partners is available, the device controller 302 sends the assigned encryption key and the channel number to the available communicating partner terminal through the point-to-point network interface 308. The encryption key and the channel number is also returned to the requesting terminal 114–120 through the point-to-point network interface 308. After all the communicating partners are contacted, represented by line 406 in FIG. 7, the device controller 302 enters the assigned encryption key, the assigned channel number and the terminal addresses of the participating communicating partners in a list 408.

The list 408 contains information regarding all the private broadcast communications that are currently active. Each entry of the list contains all the information related to one private broadcast communication.

The device controller 302 monitors the broadcast communication corresponding to each entry of the list 408. If either a release message is received or no activity is detected in the assigned channel for a predetermined amount of time, corresponding to each of the entries in the list 408, the device controller 302 terminates the private broadcast communication of the corresponding entry. The termination process, represented by line 410 in FIG. 7, may be simply returning the encryption key and the channel number to the encryption key pool 402 and the channel number pool 404. Alternatively, the device controller 302 may explicitly issue a private broadcast communication end message or an invalidate encryption key command to all the participating terminals so that the assigned encryption key is explicitly deleted from each of the terminals.

Figure 8:
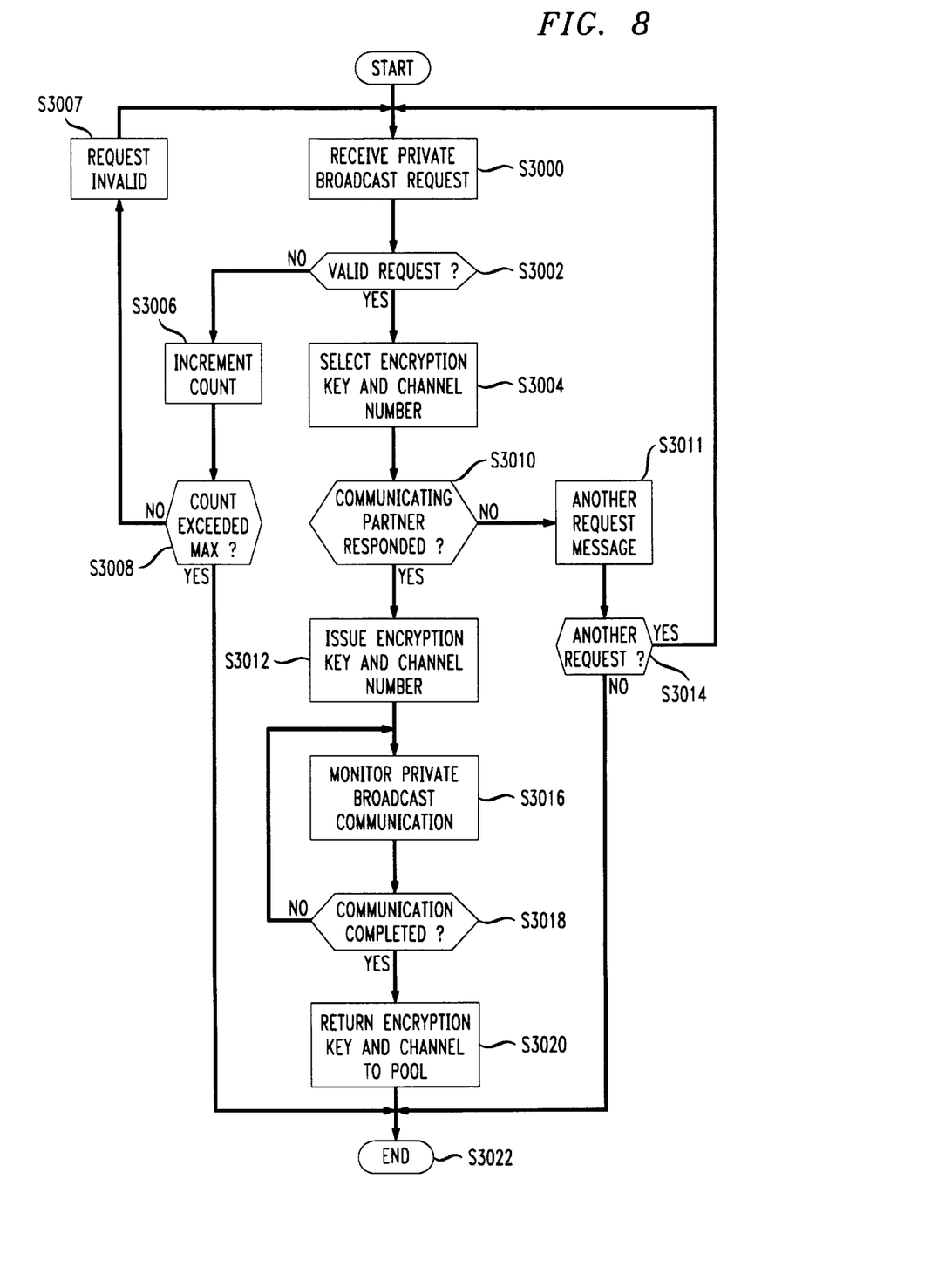
FIG. 8 is a flowchart of a private communication device process.

FIG. 8 shows a process for the private broadcasting device 102. In step S3000, the device controller 302 receives the private broadcast request and goes to step S3002. In step S3002, the device controller 302 determines whether the private broadcast request is valid by verifying that the password is valid and/or determining that the account number is valid, for example. If the private broadcast request is valid, the device controller 302 goes to step S3004; otherwise, the device controller 302 goes to step S3006.

In step S3006, the device controller 302 increments account and goes to step S3008. In step S3008, the device controller determines whether the count has exceeded a maximum. If the count has not exceeded a maximum, the device controller 302 goes to step S3007. In step S3007, the device controller 302 returns a "request invalid" message to the requesting terminal 114–120 and returns to step S3000.

In step S3004, the device controller 302 selects an encryption key and a channel number to be assigned to the private broadcast request and goes to step S3010. In step S3010, the device controller 302 attempts to contact each of the communicating partners in the private broadcast request. If at least one of the communicating partners responded to the contact, the device controller 302 goes to step S3012; otherwise, the device controller 302 goes to step S3011. In step S3011, the device controller 302 sends "another request?" message to the requesting terminal 114–120 to query whether the subscriber would like to request another private broadcast communication and then goes to step S3014. If the requesting terminal 114–120 desires another request, the device controller 302 returns to step S3000; otherwise, the device controller 302 goes to step S3022 and ends the process.

In step S3012, the device controller 302 issues the selected encryption key and the channel number and goes to step S3016. In step S3016, the device controller 302 monitors the private broadcast communication and goes to step S3018. In step S3018, the device controller 302 determines whether the private broadcast communication has completed. The device controller 302 may either receive a "release encryption" key message or determines that the private broadcast communication has had no activity for a predetermined amount of time. If the communication has not completed, the device controller 302 returns to step S3016; otherwise, the device controller goes to step S3020. In step S3020, the device controller 302 returns the encryption key and the channel number to the encryption key pool and the channel number pool, respectively, and goes to step S3022 and end the process.

While this invention has been described in conjunction with specific embodiments thereof, it is evident that many alternatives, modifications and variations would be apparent to those skilled in the art. For example, the encryption key may be assigned at the time a user subscribes to the private broadcast system. Thus, the encryption key is comparable to a Personal Identification Number (PIN) commonly used for bank Automatic Teller Machines (ATM). Thus, when a subscriber desires to engage in private broadcast communication, he merely seeks out an available channel (i.e., acquires use of a channel via an established protocol), contacts at least one communicating partner, and begins broadcasting. The encryption key may be shared by the subscriber or even changed much like the PIN's. Also, channel numbers may either be assigned during subscription or acquired for a limited amount of time when needed. Accordingly, preferred embodiments of the invention as set forth herein are intended to be illustrative, not limiting. Various changes may be made without departing from the spirit and scope of the invention as defined in the following claims.

What is claimed is:

1. A private broadcast communication system, comprising:

a broadcast network;

a point-to-point network;

a plurality of terminals coupled to the broadcast network and the point-to-point network; and a private broadcasting device coupled to the broadcast network, the point-to-point network and the terminals, wherein the private broadcasting device assigns an encryption key and a channel number through the point-to-point network to a portion of the terminals, the portion of the terminals capable of private broadcast communication over the broadcast network using the encryption key and the channel number.

2. The system of claim 1, wherein each of the terminals comprises:

an user interface;

a first broadcast network interface;

a first point-to-point network interface; and a first controller coupled to the user interface, the broadcast network interface and the first point-to-point network interface, the first controller receiving inputs from the user interface and communicates with the private broadcasting device through either the first broadcast or the first point-to-point network interfaces based on the inputs.

3. The system of claim 2, wherein the first controller transmits a private broadcast request to the private broadcasting device through either the point-to-point network or the broadcast network.

4. The system of claim 3, wherein the private broadcast request includes an identification of at least one communicating partner.

5. The system of claim 4, wherein the identification of the at least one communicating partner is a group name identifying a list of communicating partners.

6. The system of claim 3, wherein the private broadcast request includes at least one of a requested bandwidth and an estimated time interval.

7. The system of claim 3, wherein the first controller receives the encryption key from the private broadcasting device after transmitting the private broadcast request.

8. The system of claim 7, wherein the first controller releases the encryption key after the private broadcast communication is completed.

9. The system of claim 2, wherein the first broadcast network interface includes:

an encryptor; and a de-encryptor, the first broadcast network interface transmits to the broadcast network information encrypted with the encryption key and de-encrypts information received from the broadcast network using the encryption key.

10. The system of claim 2, wherein the first controller receives a channel number from the private broadcasting device after transmitting either a private broadcast request or an accept message.

11. The system of claim 10, wherein the first controller transmits encrypted information and receives encrypted information using a channel corresponding to the channel number.

12. The system of claim 2, wherein the first controller receives a contact from the private broadcasting device, the first controller determining whether a user is available to participate in the private broadcast communication, if the user is available, the first controller returning an accept message to the private broadcasting device.

13. The system of claim 12, wherein the first controller receives an encryption key after returning the accept message, the first broadcast network interface encrypting information using the encryption key for transmission to the broadcast network and de-encrypting information received from the broadcast network.

14. The system of claim 1, wherein the private broadcast device comprises:

a second point-to-point network interface;

a second broadcast network interface; and a second controller coupled to the second point-to-point network interface and the second broadcast network interface, the second controller controlling a pool of encryption keys.

15. The system of claim 14, wherein the second controller receives a private broadcast request from a requesting terminal through either the point-to-point network interface or the broadcast network interface, the second controller selecting an encryption key from the pool of encryption keys based on the private broadcast request.

16. The system of claim 15, wherein the second controller contacts at least one communicating partner based on the private broadcast request, if a communicating partner of the at least one communicating partner is available, the second controller issuing the selected encryption key to the requesting terminal and the available communicating partner.

17. The system of claim 15, wherein the private broadcast request includes an identification of a group, the private broadcasting device retrieving identification of communicating partners of the identified group and contacting the communicating partners for the private broadcast communication.

18. The system of claim 16, wherein the second controller monitors the private broadcast communication and determines whether the private broadcast communication is completed, if the private broadcast communication is completed, the second controller returning the selected encryption key to the pool of encryption keys.

19. The system of claim 18, wherein if the private broadcast communication is completed, the second controller issues an invalidate command to terminals participating in the private broadcast communication, the terminal participating in the private broadcast communicating deleting the encryption key.

20. The system of claim 18, wherein the private broadcast communication is completed if either a release message is received or no activity is detected for a predetermined amount of time on a channel used for the private broadcast communication.

21. The system of claim 15, wherein the private broadcasting device selects a channel from a pool of channels based on the private broadcast request, when at least one communicating partner is available, the private broadcasting device assigning the channel to terminals participating in the private broadcast communication, the private broadcasting device returning the channel to the pool of channels after the private broadcast communication is completed.

22. The system of claim 1, wherein the broadcast and the point-to-point networks are individually either a wired or a wireless network.

23. A method for operating a private broadcasting system, comprising:

assigning an encryption key and a channel number to a portion of a plurality of terminals through a point-to-point network; and broadcasting using the encryption key and the channel number through a broadcasting network for a private broadcast communication between the portion of the plurality of terminals.

24. The method of claim 23, further comprising:

receiving inputs from an user interface of one of the terminals; and communicating with a private broadcasting device through either a broadcast network interface or a pointto-point network interface of the one of the terminals based on the received inputs.

25. The method of claim 24, wherein the communicating step includes transmitting a private broadcast request to the private broadcasting device.

26. The method of claim 25, wherein the private broadcast request includes an identification of at least one communicating partner.

27. The method of claim 25, wherein the private broadcast request includes at least one of a requested bandwidth and an estimated time interval.

28. The method of claim 25, wherein the identification of the at least one communicating partner is a group name identifying a list of communicating partners.

29. The method of claim 25, further comprising receiving the encryption key from the private broadcasting device after transmitting the private broadcast request.

30. The method of claim 29, further comprising:
receiving information from the user interface;
encrypting the information using the encryption key; and
transmitting the encrypted information on the broadcast network.

31. The method of claim 29, further comprising:
receiving encrypted information from the broadcast network; and
de-encrypting the encrypted information using the encryption key.

32. The method of claim 29, further comprising releasing the encryption key after the private broadcast communication is completed.

33. The method of claim 29, further comprising receiving a channel number from the private broadcasting device after transmitting the private broadcast request and transmitting and receiving information using a channel corresponding to the channel number.

34. The method of claim 23, further comprising:
receiving a contact from a private broadcasting device; and
transmitting an accept message to the private broadcasting device.

35. The method of claim 34, further comprising receiving the encryption key from the private broadcasting device after transmitting the accept message.

36. The method of claim 35, further comprising:
receiving information from the user interface;
encrypting the information using the encryption key; and
transmitting the encrypted information on the broadcast network.

37. The method of claim 35, further comprising:
receiving encrypted information from the broadcast network; and
de-encrypt the encrypted information using the encryption key.

38. The method of claim 34, further comprising receiving a channel number from the private broadcasting device after transmitting the accept message and at least one of transmitting and receiving information using a channel corresponding to the channel number.

39. The method of claim 23, further comprising:
receiving a private broadcast request from a requesting terminal; and
contacting at least one communicating partner identified by the private broadcast request.

40. The method of claim 39, further comprising:
selecting an encryption key from a pool of encryption keys; and
sending the encryption key to the requesting terminal and at least one communicating partner.

41. The method of claim 39, further comprising:
monitoring the private broadcast communication; and
returning the encryption key to the pool of encryption keys after the private broadcast communication is completed.

42. The method of claim 41, further comprising:
sending an invalidate command to the requesting terminal and the at least one communicating partner after the private broadcast communication is completed; and
removing the encryption key from the requesting terminal and the at least one communicating partner.

43. The method of claim 41, wherein the private broadcast communication is completed when a release message is received or when no activity is detected for the private broadcast communication.

44. The method of claim 39, further comprising:
selecting a channel number from a pool of channel numbers; and
sending the channel number to the requesting terminal and the at least one communicating partner.

45. The method of claim 23, wherein the broadcast and the point-to-point networks are individually either a wired or a wireless network.

* * * * *